United States Patent
Katkade et al.

(10) Patent No.: US 11,200,223 B2
(45) Date of Patent: Dec. 14, 2021

(54) SYSTEM AND METHOD FOR DEPENDENCY ANALYSIS IN A MULTIDIMENSIONAL DATABASE ENVIRONMENT

(71) Applicant: ORACLE INTERNATIONAL CORPORATION, Redwood Shores, CA (US)

(72) Inventors: Pralhad Katkade, Pune (IN); Natalia Reichman, Beer Sheva (IL); Sergei Riaboi, Beer Sheva (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 206 days.

(21) Appl. No.: 16/439,532

(22) Filed: Jun. 12, 2019

(65) Prior Publication Data

US 2020/0125550 A1 Apr. 23, 2020

(30) Foreign Application Priority Data

Oct. 18, 2018 (IN) .............................. 201841039503

(51) Int. Cl.
 *G06F 16/00* (2019.01)
 *G06F 16/23* (2019.01)
 *G06F 16/2455* (2019.01)
(52) U.S. Cl.
 CPC ...... *G06F 16/2365* (2019.01); *G06F 16/2455* (2019.01)
(58) Field of Classification Search
 CPC . G06F 16/283; G06F 16/2455; G06F 16/2365
 See application file for complete search history.

(56) References Cited

U.S. PATENT DOCUMENTS

| 5,574,952 | A | 11/1996 | Brady |
| 5,915,129 | A | 6/1999 | Slivka |
| 6,161,105 | A | 12/2000 | Keighan |
| 6,167,396 | A * | 12/2000 | Lokken ................. G06F 16/283 707/737 |
| 6,574,720 | B1 | 6/2003 | Hopeman |
| 6,629,102 | B1 | 9/2003 | Malloy |
| 6,766,325 | B1 | 7/2004 | Pasumansky |
| 7,133,876 | B2 | 11/2006 | Roussopoulos |
| 7,222,130 | B1 * | 5/2007 | Cras ...................... G06F 16/283 707/803 |
| 7,392,242 | B1 | 6/2008 | Baccash |
| 8,156,083 | B2 | 4/2012 | Banerjee |
| 9,081,830 | B1 * | 7/2015 | Stolte .................... G06F 16/283 |
| 9,390,082 | B1 * | 7/2016 | Stolte .................... G06F 40/18 |

(Continued)

OTHER PUBLICATIONS

European Patent Office, International Searching Authority, International Search Report and Written Opinion dated Nov. 29, 2019 for International Application No. PCT/US19/56363, 16 pages.

(Continued)

*Primary Examiner* — Cheryl Lewis
(74) *Attorney, Agent, or Firm* — Tucker Ellis LLP (57) ABSTRACT

In accordance with an embodiment, dependency analysis is done for each dynamic (or temporary) member to collect list of runtime as well as static dependents in both BSO (block storage option) and ASO (aggregate storage option) cubes. This enables the member to join hybrid flow for its execution in bottom up approach.

11 Claims, 8 Drawing Sheets

(56) References Cited

U.S. PATENT DOCUMENTS

| | | |
|---|---|---|
| 10,083,195 B2 | 9/2018 | Zhou |
| 10,318,498 B2 | 6/2019 | Tran |
| 10,346,435 B2 | 7/2019 | Walker |
| 10,360,527 B2 | 7/2019 | Abe |
| 10,467,251 B2 | 11/2019 | Menon |
| 2002/0029207 A1 | 3/2002 | Bakalash |
| 2003/0005420 A1 | 1/2003 | Ghosh |
| 2004/0054858 A1 | 3/2004 | Chandrasekaran |
| 2005/0262108 A1 | 11/2005 | Gupta |
| 2006/0010159 A1 | 1/2006 | Mirchandani |
| 2006/0085742 A1 | 4/2006 | Harold |
| 2006/0106769 A1 | 5/2006 | Gibbs |
| 2006/0271568 A1 | 11/2006 | Balkir |
| 2007/0027674 A1 | 2/2007 | Parson |
| 2007/0061344 A1 | 3/2007 | Dickerman |
| 2007/0088691 A1 | 4/2007 | Dickerman |
| 2007/0094668 A1 | 4/2007 | Jacquot |
| 2008/0288524 A1 | 11/2008 | Dumitru |
| 2009/0030915 A1 | 1/2009 | Winter |
| 2009/0198663 A1* | 8/2009 | Yang .................... G06F 16/283 |
| 2009/0248651 A1 | 10/2009 | Perry |
| 2009/0249125 A1 | 10/2009 | Bhatawdekar |
| 2009/0276705 A1 | 11/2009 | Ozdemir |
| 2014/0046920 A1 | 2/2014 | Shuma |
| 2014/0122413 A1 | 5/2014 | Presti |
| 2017/0116032 A1 | 4/2017 | Tran |
| 2017/0116215 A1 | 4/2017 | Ramaiyer |
| 2017/0116281 A1 | 4/2017 | Roytman |
| 2017/0116290 A1 | 4/2017 | Reichman |
| 2017/0116309 A1 | 4/2017 | Menon |
| 2017/0116310 A1 | 4/2017 | Walker |
| 2017/0116311 A1 | 4/2017 | Reichman |
| 2017/0116312 A1 | 4/2017 | Reichman |
| 2017/0116313 A1* | 4/2017 | Roytman ............. G06F 16/283 |
| 2019/0073366 A1 | 3/2019 | Raimaiyer |
| 2019/0079959 A1 | 3/2019 | Raimaiyer |
| 2019/0102445 A1 | 4/2019 | Raimaiyer |
| 2019/0102446 A1 | 4/2019 | Raimaiyer |
| 2019/0102447 A1 | 4/2019 | Raimaiyer |
| 2019/0258612 A1 | 8/2019 | Tran |
| 2019/0286638 A1 | 9/2019 | Walker |
| 2020/0050496 A1* | 2/2020 | Menon .................. G06F 16/283 |

OTHER PUBLICATIONS

Russakovsky, Alexander, "Hopping over Big Data: Accelerating Ad-hoc OLAP Queries with Grasshopper Algorithms" published Feb. 26, 2015, 30 pages.

Dynamic Flow process definition Nov. 26, 2018, google.com, hllps://www.google.com/search?biw=1920&bih=1076&ei=njv8W_CJD4mizwK_l4gCQ&q=%22dynamic+flow+process%22+definition&oq=%22dynamic+flow+process%22+definition&gs l=psy-ab .3 ... 38876 .39886 ... 40199 ... 0 .0 ... 0. 76.437 .8 ...... 1 .. gws-.viz ....... Oi71 j0i7i30j0i30j0i8i30.

Dynamic Flow process OLAP Nov. 26, 2018, google.com, https://www.google.com/search?biw=1920&bih=1076&ei=njv8W_CJD4mizwK_l4gCQ&q=%22dynamic+flow+process%22+definition&oq=%22dynamic+flow+process%22+definition&gs I=psy-ab .3 ... 38876 .39886 .. 40199 ... 0 .0 .. 0. 76.437 .8 ...... 1 .. gws-.viz ....... Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

ORACLE©, Oracle Enterprise Performance Management System Documentation, Release 11.1.2.4/ Essbase, Database Administrator's Guide, Developing Formulas for Block Storage Databases, Copyright© 2019, 28 pages.

Larimer, Mike et al., Oracle, OAC Essbase Hybrid Block Storage Option Performance Tuning, White Paper, Oracle©, Jun. 11, 2018, 24 pages.

Oracle, Oracle® Cloud, Oracle Cloud Administering Oracle Essbase Cloud, Copyright© 1996, 2016, 632 pages.

Oracle, Oracle® Cloud, Administering Oracle Analytics Cloud—Essbase, Copyright© 1996, 2017, 703 pages.

Essbase Information Development Team, Oracle® Cloud, Technical Reference for Oracle Analytics Cloud—Essbase, E70189-04, Sep. 2017, Copyright© 1996, 2017, 1044 pages.

EPM Information Development Team, Oracle® Essbase Release 11.1.1, Database Administrator's Guide, Copyright© 1996, 2008, 1182 pages.

EPM Information Development Team, Oracle® Essbase, Technical Reference, Release 11.1.2.2.100, Copyright© 1996, 2012, 1402 pages.

EPM Information Development Team, Oracle® Essbase Database Administrator's Guide, Release 11.1.2.2.100, Updated Dec. 2013, Copyright© 1996, 2013, 1138 pages.

Turrell, Jake, "Introduction to Essbase Hybrid Aggregation Mode", Mar. 4, 2015, 12 pages, retreived on Jan. 15, 2020 from <http://turrellconsulting.com/blog/?s=introduction+to+essbase+hybrid+aggregation+mode&searchsubmit=U>.

Jankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.

Oracle, Oracle® Business Intelligence Cloud Service Data Sync, Getting Started, Release 2.2, Sep. 2016, Copyright © 2010, 2016, 6 pages.

Oracle, Oracle® Business Intelligence Cloud Service Data Sync, Read Me, Release 2.2, Sep. 2016, Copyright © 2016, 6 pages.

Harvey, Rosie et al., ORACLE® Cloud, Preparing Data in Oracle Business Intelligence Cloud Service, E64760-07, Feb. 2017, Copyright©2014, 2017, 282 pages.

Williams, Richard, "Configuring the Data Sync Tool for BI Cloud Service (BICS)", Apr. 24, 2015, 20 pages.

Oracle, Loading Data with Oracle BI Cloud Service Data Sync, Tutorial, Copyright © 2015, 34 pages.

\* cited by examiner

|  | Scenario Test Jan New York | Scenario Test Jan Massachu | Scenario Test Jan Florida | Scenario Test Jan Connectic | Scenario Test Jan New Ham | Scenario Test Jan East | Scenario Sales Jan New York | Scenario Sales Jan Massachu | Scenario Sales Jan Florida | Scenario Sales Jan Connectic | Scenario Sales Jan New Ham | Scenario Sales Jan East |
|---|---|---|---|---|---|---|---|---|---|---|---|---|
| Cola | 1812 | 0 | 0 | 0 | 0 | 2105 | 678 | 494 | 210 | 310 | 120 | 1812 |
| Diet Cola | 200 | 0 | 0 | 0 | 0 | 2105 | #Missing | #Missing | 200 | #Missing | #Missing | 200 |
| Caffeine Free Cola | 93 | 0 | 0 | 0 | 0 | 6780 | 678 | #Missing | #Missing | #Missing | 93 | 93 |
| Colas | 2105 | 0 | 0 | 0 | 0 | 1853 | 678 | 494 | 410 | 310 | 213 | 2105 |
| Old Fashioned | 647 | 0 | 0 | 0 | 0 | 1853 | 61 | 126 | 190 | 180 | 90 | 647 |
| Diet Root Beer | 310 | 0 | 0 | 0 | 0 | 1853 | #Missing | #Missing | 100 | 130 | #Missing | 310 |
| Sasparilla | #Missing | 0 | 0 | 0 | 0 | 6780 | #Missing | 341 | #Missing | #Missing | #Missing | 898 |
| Birch Beer | 898 | 0 | 0 | 0 | 0 | 1609 | 490 | 467 | 370 | 310 | 65 | 1853 |
| Root Beer | 1853 | 0 | 0 | 0 | 0 | 1609 | 551 | 130 | 120 | 190 | 153 | 999 |
| Dark Cream | 999 | 0 | 0 | 0 | 0 | 1609 | 483 | 130 | 150 | 170 | 76 | 500 |
| Vanilla Cream | 500 | 0 | 0 | 0 | 0 | 6780 | 160 | #Missing | 110 | #Missing | #Missing | 110 |
| Diet Cream | 110 | 0 | 0 | 0 | 0 | 1213 | #Missing | 130 | 360 | 360 | 76 | 1609 |
| Cream Soda | 1609 | 0 | 0 | 0 | 0 | 1213 | 663 | 80 | 80 | 123 | 45 | 562 |
| Grape | 562 | 0 | 0 | 0 | 0 | 1213 | 234 | #Missing | 219 | #Missing | #Missing | 219 |
| Orange | 219 | 0 | 0 | 0 | 0 | 6780 | 219 | 80 | 81 | 34 | 43 | 432 |
| Strawberry | 432 | 0 | 0 | 0 | 0 | 6780 | 134 | 160 | 161 | 217 | 88 | 1213 |
| Fruit Soda | 1213 | 0 | 0 | 0 | 0 | 2105 | 567 | #Missing | 200 | #Missing | #Missing | 200 |
| Diet Cola | 200 | 0 | 0 | 0 | 0 | 1853 | #Missing | #Missing | 180 | #Missing | #Missing | 310 |
| Diet Root Beer | 310 | 0 | 0 | 0 | 0 | 1609 | #Missing | #Missing | 110 | 130 | #Missing | 110 |
| Diet Cream | 110 | 0 | 0 | 0 | 0 | 6780 | #Missing | #Missing | 110 | #Missing | #Missing | 620 |
| Diet Drinks | 620 | 0 | 0 | 0 | 0 | 6780 | #Missing | 490 | #Missing | 130 | #Missing | 6780 |
| Product | 6780 | 0 | 0 | 0 | 0 | 6780 | 2479 | 1251 | 1321 | 1197 | 532 | 6780 |

FIGURE 5

| | Jan | Test | Scenario | | | |
|---|---|---|---|---|---|---|
| | New York | Massachu | Florida | Connectic | New Ham | East |
| Cola | 1812 | 6 | 6 | 6 | 6 | 2105 |
| Old Fashioned | 647 | 6 | 6 | 6 | 6 | 1853 |
| Dark Cream | 999 | 6 | 6 | 6 | 6 | 1609 |
| Grape | 562 | 6 | 6 | 6 | 6 | 1213 |

Provide, at a computer that includes one or more microprocessors, a multidimensional database server executing on the computer, wherein the multidimensional database server supports at least one multidimensional cube, wherein the multidimensional database comprises a plurality of dimensions, each of the plurality of dimensions comprising a plurality of members, and a dynamic member, wherein the dynamic member depends upon a set of the plurality of members.
810

Perform performing dependency analysis to determine the set of the plurality of members on which the dynamic member depends.
820

*FIGURE 8*

SYSTEM AND METHOD FOR DEPENDENCY ANALYSIS IN A MULTIDIMENSIONAL DATABASE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to India Patent Application entitled "SYSTEM AND METHOD FOR DEPENDENCY ANALYSIS IN A MULTIDIMENSIONAL DATABASE ENVIRONMENT", Application No. 201841039503, filed on Oct. 18, 2018, which application is herein incorporated by reference.

FIELD OF INVENTION

Embodiments of the invention are generally related to databases and data warehousing, and are particularly related to systems and methods for dependency analysis in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein are systems and methods for dependency analysis in a multidimensional database, in accordance with an embodiment. A dynamic member may depend on other members from the same outline, which are called as dependents of the formula, and naturally these dependents have to be calculated first in order to evaluate original formula for each intersection. Therefore, to evaluate a dynamic member's formula in a hybrid data aggregation model, the system can first have ready a list of all members this formula depends on. Moreover, the list of dependents of a dynamic member may be categorized as "runtime dependents" and "static dependents". Run time dependents of a dynamic member are the dependents that are different for each intersection whereas static dependents are those that are constant irrespective of intersections. This analytical process of identifying runtime as well as static dependents of a dynamic member is termed as dependency analysis in hybrid data aggregation models.

In accordance with an embodiment, an exemplary method for dependency analysis in a multidimensional database can provide, at a computer that includes one or more microprocessors, a multidimensional database server executing on the computer, wherein the multidimensional database server supports at least one multidimensional cube, wherein the multidimensional database comprises a plurality of dimensions, each of the plurality of dimensions comprising a plurality of members, and a dynamic member, wherein the dynamic member depends upon a set of the plurality of members. The method can perform performing dependency analysis to determine the set of the plurality of members on which the dynamic member depends.

In accordance with an embodiment, the performance of dependency analysis can comprise tokenizing the dynamic member resulting in one or more tokens of the dynamic member. The dependency analysis can then analyze each of the one or more tokens of the dynamic member, and based upon the analyses of each of the one or more tokens of the dynamic member, determine that the dynamic member depends only on static dependents. In such a case, the method can fetch, based upon the determination that the dynamic member depends only on static dependents, all static dependents upon which the dynamic member is depends and transfer to an input odometer.

In accordance with an embodiment, the performance of dependency analysis can comprise tokenizing the dynamic member resulting in one or more tokens of the dynamic member. The depends analysis can then analyze each of the one or more tokens of the dynamic member, and, based upon the analyses of each of the one or more tokens of the dynamic member, determine that the dynamic member depends on one or more runtime dependents. The method can then produce, based upon the determination that the dynamic member depends on one or more runtime dependents, an array of the one or more runtime dependents. The method can also produce, based upon the produced array of the one or more runtime dependents, a list of runtime dependent members of the multidimensional database cube.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
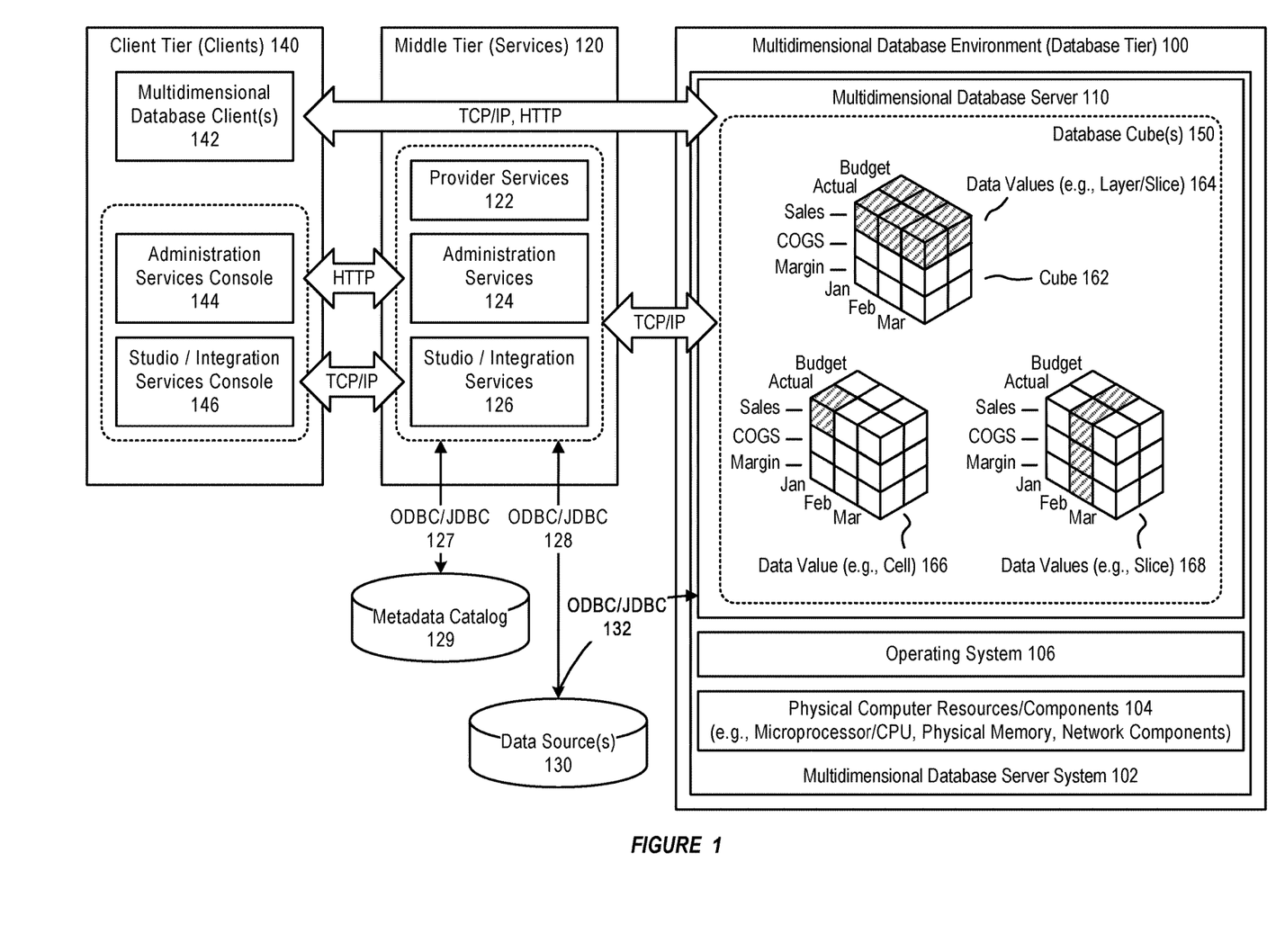
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-In

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

In accordance with an embodiment, OLAP systems can organize data in multiple dimensions allows searchers/users of the data set to conduct directed searches that traverse various dimensions to ultimately arrive at the result of interest. OLAP systems can view data as residing at the intersection of dimensions. Put another way, the data underlying OLAP systems can be organized and stored as a multi-dimensional database which is an instantiation of the cross-product of all of the dimensions. This allows users/searchers to traverse hierarchies of detail along dimensions of interest in an ad hoc manner to get at specific, targeted data. Slowly changing data can be represented as metadata within a current data set.

Hybrid Multidimensional Database

In accordance with an embodiment, the system supports the use of a dynamic flow (referred to herein in some examples as Query Processing Dynamic Flow (QPDF)) in a multidimensional database (e.g., Essbase) computing environment. The dynamic flow process enables hybrid use of, for example, Aggregate Storage Option (ASO), Block Storage Option (BSO), or other types of storage containers, and provides a common flow to process a received input query in bottom-up mode. The approach can be used to reduce the size of the cube, which provides for efficient calculation of dynamic members.

For example, in accordance with an embodiment, for queries accessing dynamic sparse members, the system can use an aggregate storage engine to satisfy the request. For queries that cannot be processed by the aggregate storage engine, the system can employ a block storage engine to satisfy the request, including for example bringing the data into an aggregate storage temporary tablespace.

For example, in accordance with an embodiment, when executed by a computer system, the dynamic flow process can operate upon a multidimensional database to: (1) expand an input query to find all base/calculated data; (2) analyze the expanded query to find dependencies and an order of calculation; (3) define calculation units according to the preceding steps; (4) build a processing flow with the defined calculation units, and connect them; and (5) execute the processing flow, and determine a response to the input query.

Figure 2:
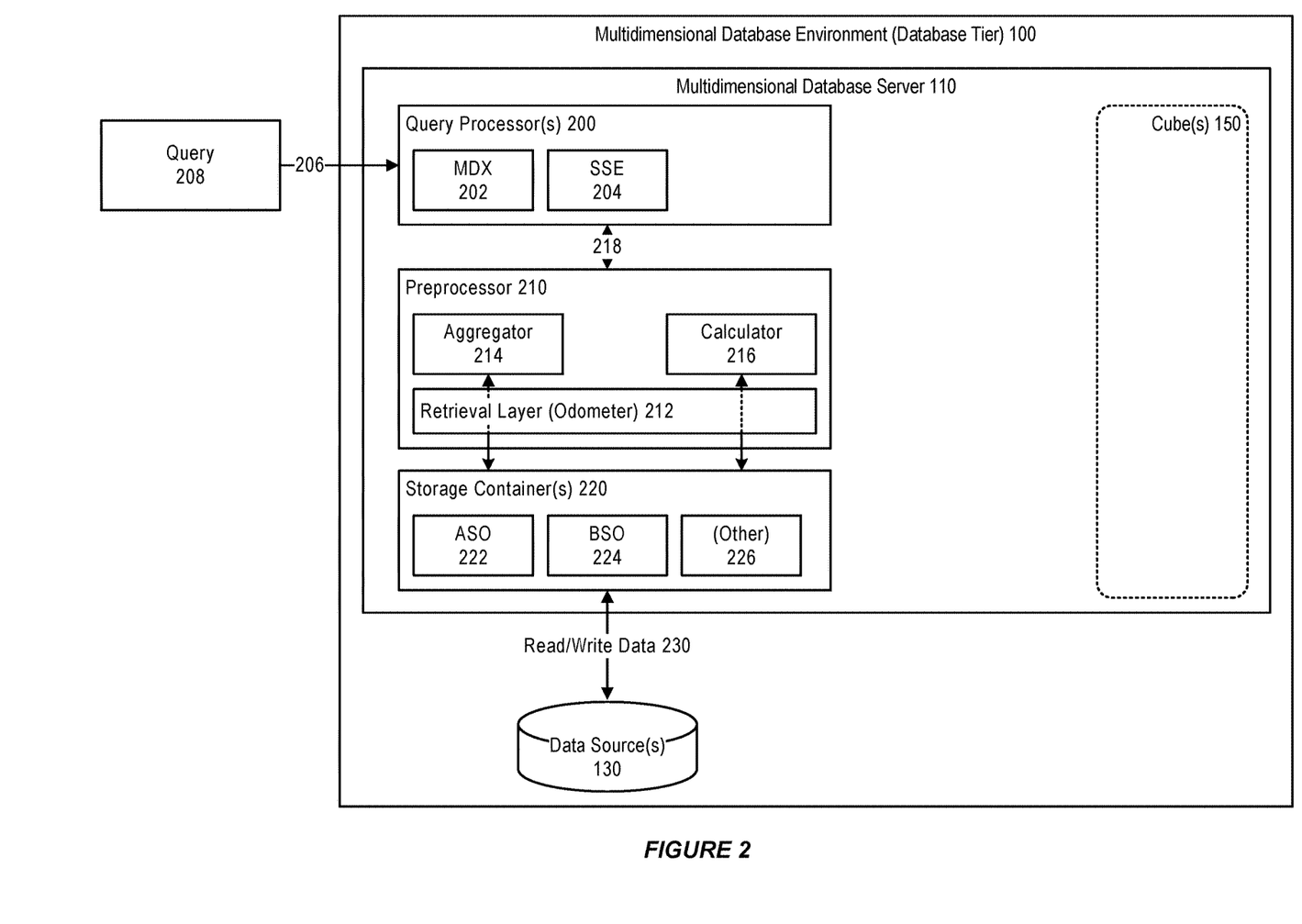
FIG. 2 illustrates use of a dynamic flow with a multidimensional database, in accordance with an embodiment.

FIG. 2 illustrates use of a dynamic flow with a multidimensional database, in accordance with an embodiment.

In a typical multidimensional environment, in order to prepare the system to respond to input queries, the database server pre-calculates values for certain dimensions, and stores those pre-calculated values in the cube for later lookup.

In accordance with an embodiment, when a dynamic flow is instead used, the ability to support dynamic query processing enables the database server to avoid pre-calculating and storing such values, which improves performance and reduces the storage of potentially empty cells.

As illustrated in FIG. 2, in accordance with an embodiment, the system can include one or more query processor(s) 200, for example a Multidimensional Expressions (MDX) query processor 202, and/or a SpreadSheet Extractor (SSE) 204 query processor, that enable receipt 206 of an input query 208 from a client, to retrieve, access, or otherwise examine a set of data from a data source, as provided by and made accessible via the multidimensional database.

In accordance with an embodiment, a preprocessor component 210 can include a data retrieval layer 212 or data fetching component (which in some environments can incorporate a kernel-based odometer retriever, or odometer or data structure stored in memory that manages pointers to data blocks, contains control information, or otherwise acts as an array of arrays of pointers to stored members), an aggregator component 214, and a calculator component 216, each of these layers and components can be provided as a software or program code that is executable by a computer system.

Generally, described, in accordance with an embodiment, the preprocessor receives 218 input queries, from the one or more query processor(s), for processing against the multidimensional database. The aggregator is adapted to perform hierarchical aggregations of the data. The calculator is adapted to perform calculations on the data, and to cooperate with the aggregator, as further described below, to utilize the data retrieval layer (including an odometer as appropriate) to at least one of populate and/or search within a cube, and to process a response to an input query.

In accordance with an embodiment, the system can include one or more storage container(s) 220, such as, for example, one or more of an Aggregate Storage Option (ASO) 222, Block Storage Option (BSO) 224, or other type of storage container 226, each of which storage containers can act as an interface between the data that is read from/written to 230 the data source or multidimensional database, and whichever data might be needed for aggregation and calculation at the preprocessor.

Figure 3:
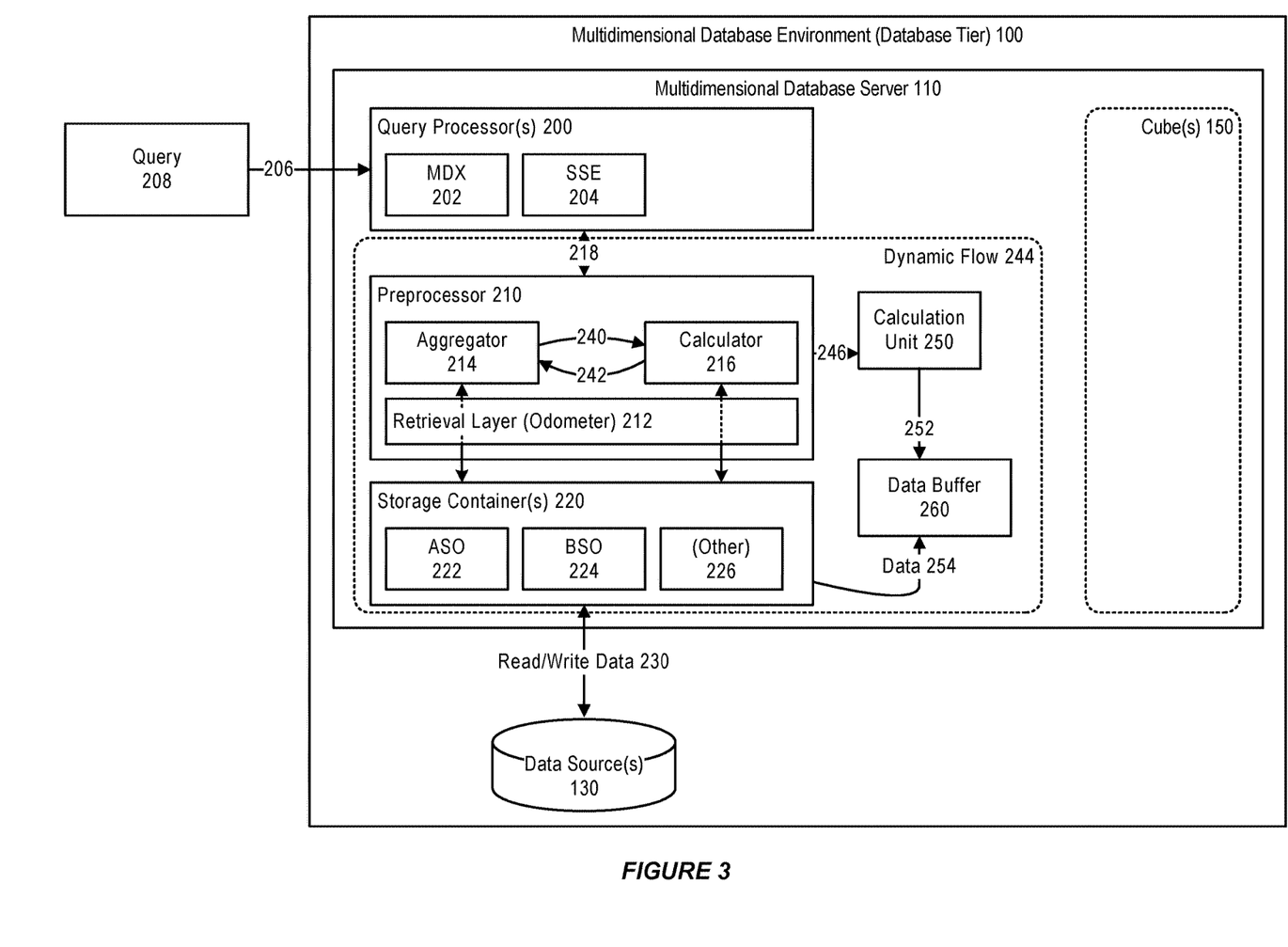
FIG. 3 further illustrates use of a dynamic flow with a multidimensional database, in accordance with an embodiment FIG. 4, which shows exemplary function stacks, in accordance with an embodiment.

FIG. 3 further illustrates use of a dynamic flow with a multidimensional database, in accordance with an embodiment.

As illustrated in FIG. 3, in accordance with an embodiment, in response to the database server receiving an input query, the aggregator can operate 240, 242 in combination with the calculator, to process the query, as part of a dynamic flow 244, which can be similarly provided as software or program code that is executable by a computer system.

For example, as illustrated in FIG. 3, the dynamic flow process enables hybrid use of, in this example, one or more ASO, BSO, or other types of storage containers, and provides a common flow to process the query using these storage containers, in a bottom-up mode.

In accordance with an embodiment, when the system begins to process an input query, it first determines, from an examination of the input query, which particular data or other information needs to be retrieved, i.e., a metadata. The system can then define 246 for that input query, an initial calculation unit 250, which encapsulates an aggregation/calculation process that will retrieve a set of data from the storage container(s).

In accordance with an embodiment, a data buffer 260 (referred to herein, in some examples, as one or more output buckets) operates as a data structure into which each calculation unit can read/write data 252, and which allows for a temporary storage of the data received from 254 the storage container(s), for consumption by calculation unit(s).

In accordance with an embodiment, when the dynamic flow is used with a BSO-type storage container, the dynamic flow process performs a pre-analysis of an input query, and an expansion of asked points to its base data.

However, the amount of such expanded base data may be quite large.

To address this, and to reduce the volume of expanded data, in accordance with an embodiment, a first dynamic aggregation can be performed during the fetching of data from the kernel, without a full expansion of the associated kernel structure (such as, for example, a kernel-side odometer as described above).

In accordance with an embodiment, the dynamic flow then operates to expand the input query, to find all base/calculated data; and to analyze the expanded query to find dependencies and an order of calculation.

Dependency Analysis

In accordance with an embodiment, a multidimensional database (e.g., Essbase) can comprise "m" number of dimensions, each dimension having "n" number of members, wherein each member of a dimension can be stored with loaded input value or dynamic member whose value is calculated at runtime during actual retrieval when this dynamic member is asked in the queries. Dimension members are hierarchical in nature. The cardinality of a dimension can be a total number of dimension members and each combination formulated among all dimension members represent an intersection in a multidimensional database cube. Each cube can have a stored or calculated value associated with it, and each co-ordinate of a combination represents a meaning (e.g., extracted information such as business meaning) to the intersection value.

In accordance with an embodiment, a dynamic member is of a multidimensional database can comprise a member or temporary member (created per request via a language associated with or communicable with the multidimensional database cube, such as MDX with Essbase, a request) that has a valid mathematical formula. Such a formula can be a simple arithmetic or complex formula involving complex conditional calculations of values resulted from calculations of other members from same outline on which this member depends on. Thus, the formula of such dynamic member represents its value and is evaluated for each intersection.

In accordance with an embodiment, a dynamic member may depend on other members from the same outline, which are called as dependents of the formula, and naturally these dependents have to be calculated first in order to evaluate original formula for each intersection. Therefore, to evaluate a dynamic member's formula in a hybrid data aggregation model (e.g., "Hybrid Essbase" (bottom up)), the system can first have ready a list of all members this formula depends on. Moreover, the list of dependents of a dynamic member may be categorized as "runtime dependents" and "static dependents". Run time dependents of a dynamic member are the dependents that are different for each intersection whereas static dependents are those that are constant irrespective of intersections. This analytical process of identifying runtime as well as static dependents of a dynamic member is termed as "Dependency Analysis" in hybrid data aggregation models.

In accordance with an embodiment, a hybrid aggregation for block storage databases is an aggregation model in which block storage data calculation executes with efficiency similar to that of aggregate storage databases. Hybrid aggregation offers the benefit of fast performance by removing sparse aggregations, reducing size and memory footprint, and speeding up batch routines. The deployment considerations are simplified, as users no longer have to consider using block storage for heavy use of level 0 calculations, versus aggregate storage for many upper-level aggregations, versus designing partitioned models in which the cube is split along dimensional lines to facilitate calculation performance. In block storage databases, large, sparse dimensions must be stored: making them dynamic would result in too much block I/O at query time, affecting performance. Very large stored sparse dimensions can lead to lengthy batch aggregation times, as well as large database sizes that grow in relation to the number and size of the sparse dimensions. Even with such drawbacks, block storage is widely used for its powerful functionality. Aggregate storage is designed to enable large databases with more and larger dimensions. Unlike block storage, it does not require large sparse dimensions to be pre-aggregated to achieve good query performance. The key lies in the aggregate storage engine, which facilitates rapid dynamic aggregation across large dimensionality. Hybrid utilizes the ASO.calculation engine when possible and switches to the BSO calculation engine when needed.

In accordance with an embodiment, dependency analysis can form part of the hybrid flow in a multidimensional database environment, which enables users to evaluate a dynamic member in bottom up approach by identifying all its required dependents before starting its actual evaluation. The dependency analysis described herein improves performance by eliminating recursive top-down trips redundant and obsolete.

In accordance with an embodiment, dependency analysis is done for each dynamic (or temporary) member to collect list of runtime as well as static dependents in both BSO (block storage option) and ASO (aggregate storage option) cubes. This enables the member to join hybrid flow for its execution in bottom up approach.

For the following example, consider a dynamic member with the sample formula that is shown below, which shows an exemplary dynamic member, in accordance with an embodiment. The italic text between lines discusses the functions in the lines above

```
1)  IF (@ISLEV ("Market", 0) and (@ISLEV ("SITE", 1)
    If the current member in the user's query is at level 0 of the "Market"
    dimension, and if the current member in the user's query is at level 1
    of the "SITE" dimension.
2)      IF (@ISMBR ("New York"))
        And if the current member is "New York"
3)          @PARENTVAL ("Market", "Sales");
        Then return the parent value at the dimensions "Market" and
        "Sales"
4)      ELSE
5)          6;
        Else return "6"
6)      END IF;
7)  ELSE
8)      @PARENTVAL ("Product", "Sales");
        If the conditions above are not met, return parent value at the
        dimensions "Market" and "Sales"
9)  ENDIF;
```

In accordance with an embodiment, following the above dynamic member, there are two main steps to be taken for a dependency analysis. In a first step, the during server startup, a dependency analysis is performed based upon the dynamic member. In a second step, the actual dependents are fetched using the results of the first step.

First Step—Perform Dependency Analysis During Server Startup

In accordance with an embodiment, the first step is to detect a list of runtime dependent dimensions and dependency patterns present in the dynamic formula. This logic is executed during server startup, and hence it does not contribute to MDX queries turnaround time during actual retrieval.

In accordance with an embodiment, during load of a cube (e.g., startup of a server) the systems and methods herein can read the entire outline of the cube, each and every member, and look at the formulas for each member to collect the dependents for each member. All of this dependency information is collected during server startup. Because all the dependency information is static, such a gathering step does not rely upon a user query. This dependency mapping can then be stored and called when a query for a dynamic member is called.

In accordance with an embodiment, the input of the first step of the dependency analysis is to break the dynamic formula into a list of tokenized strings.

In accordance with an embodiment, the output of such a step is at least twofold. A first output is an array of dimensions on which the dynamic formula has "run time" dependency. In looking at the example of the dynamic member above, the runtime dependency dimensions are Product and Market. These dimensions will generate, based upon the stored dependency mapping, an exact list of runtime dependent members during actual retrieval of this formula member at run time (e.g., those dimensions, whether static or runtime, that form the dependency mapping for the dependency dimensions Product and Market in the above example).

In accordance with an embodiment, a second output is the detection of any patterns present in the formula which says the list of "context" dependent dimensions used by the formula in its "IF" (conditional logic/conditional statements) conditions is different or same from that used in the body part of each "IF" of the formula. This pattern detection becomes more complex when IF-ELSE nesting is increased in the formula.

In accordance with an embodiment, in the below examples, the terms cube/database can mean an actual server or cube or database which comprises multiple dimensions, wherein each dimension's members are hierarchical and can be represented in an Outline or tree view. As well, the term MDX can refer to a multidimensional expression (MDX) which is used in a multidimensional database. In addition, the term top down or runtime dependent function can refer to a function which depends on actual query and its resultant value is evaluated in the context of actual running query. There can be a number of top down functions like: @PARENT, @CURRMBR, etc.

In accordance with an embodiment, taking the example shown above, the high level output form the first phase would consist of a list of dimensions that the dynamic member depends upon, a determination of whether there exits any IF ELSE patterns are present, and a list of dimensions used in the "IF" conditions only by runtime dependent functions. At a high level output, the list of dimensions that the example above depends on comprises Market, Product. There are IF ELSE patterns in the example. And the list of dimensions used in the "IF" conditions comprise Market, SITE.

In accordance with an embodiment, the first phase dependency analysis can be provided for as a method in stacks are created for each query (i.e., function stacks and argument stacks). These stacks can be based upon each call chain in a query.

In accordance with an embodiment, as mentioned above, an input for dependency analysis can be the formula for the query that is broken into a tokenized list. Then, the systems and methods can declare all necessary variables used internally and categorize them into respective stacks.

In accordance with an embodiment, the below pseudocode represents primary steps taken in the dependency analysis:

```
For each string token in the list of input tokens
Do
     Clear the internal two stacks: function stack and argument stack
     Local the first function name entry in the input list'
     If first function is found, push it onto the function stack
     While (it is not the end of the current call chain (detected by
     matching number of opening and closing arguments,
     such as parentheses)
     {
     If (token is function name)
     {
          Get the record of the function and store pointer;
          Push the function name record on the function stack
     }
     Else if (token is argument used by function)
     {
          Push the argument on the argument stack
     }
     Else if (token is argument separator)
          Continue
     }
     If(found a call chain to analyze)
     {
          Call function to analyze individual call chain
     }
     Clear the internal two stacks
Done
```

The above pseudocode can next be described in the form of an example. For the following example, the below outline formula can be used with reference to FIG. 4, which shows exemplary function stacks, in accordance with an embodiment.

Figure 4:
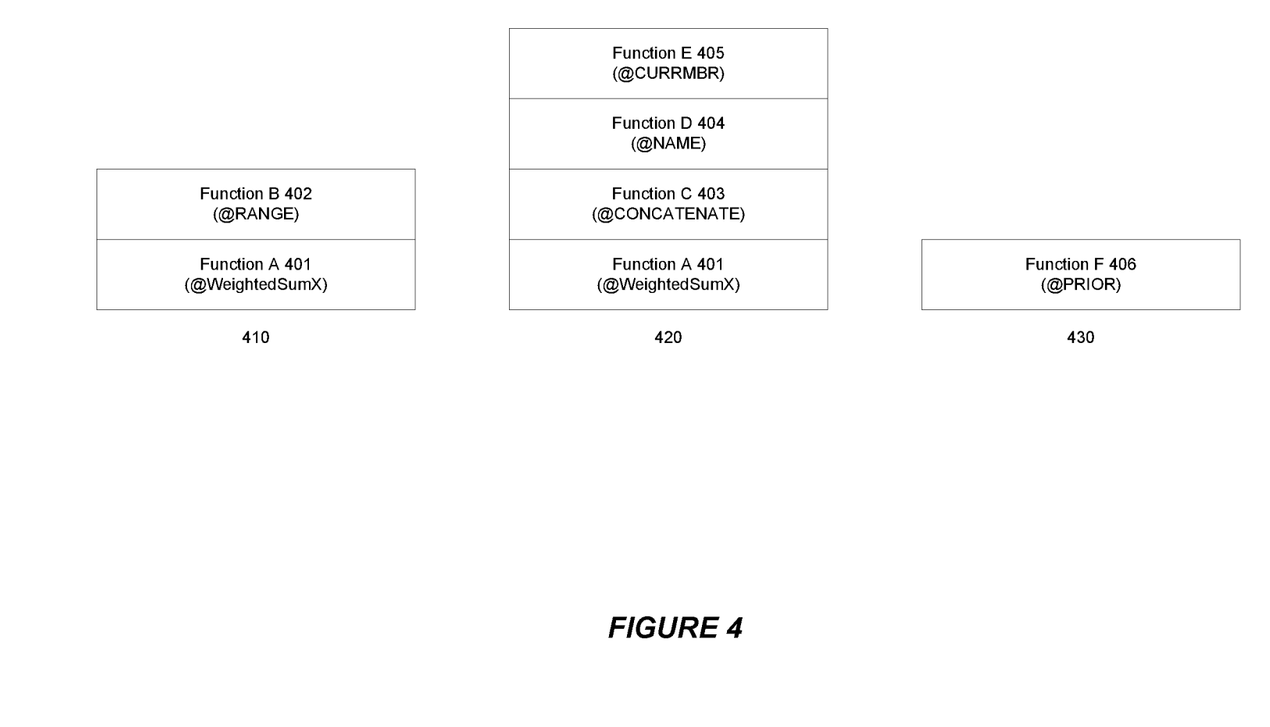

```
@WeightedSumX (@Range ("Entered Delta", USD:ZAR),
_FCCS_Rates_, "Rate.Average", @CONCATENATE ("Rate_",
@NAME(@CURRMBR(Currency))) + @PRIOR("Reporting");
```

In accordance with an embodiment, as shown in the figure, there are three individual function stacks that result from the above formula. The first function stack 410 comprises Function A (@WeightedSumX) 401 and Function B (@RANGE) 402. This represents the end of the first function call chain, with the remaining values in the call chain, "Entered Delta", and USD:ZAR being arguments, which would be placed in an argument stack.

In accordance with an embodiment, the second function stack 420 comprises Function A (@WeightedSumX) 401, Function C (@CONCATENATE) 403, Function D (@NAME) 404, and Function E (@CURRMBR) 405. This represents the end of the second function call chain, with the remaining values in the call chain, "Rate_", and Currency being arguments, which would be placed in an argument stack.

In accordance with an embodiment, the third function stack 430 comprises Function F (@PRIOR) 406. This represents the end of the third function call chain, with the remaining values in the call chain, "Reporting" being an argument, which would be placed in an argument stack.

In accordance with an embodiment, each call chain in the above example can be analyzed and runtime dimensions can be noted. In the above example, the runtime dimensions are Currency and Reporting.

In accordance with an embodiment, the above example does not contain any IF-ELSE patterns.

Second Phase: Fetch Actual Dependents Using First Phase Outputs

In accordance with an embodiment, once the first phase has been performed (note that the first phase can be performed once in the life of a cube—during server startup when it is loaded for the first time), the second phase can being. The described below second phase, used to fetch actual runtime dependents, is specific and depends upon a retrieval request (e.g., MDX query). Therefore, the logic of the actual fetching of dependents is executed for reach retrieval request (i.e., during actual query runtime). The information collected in the first phase of dependency analysis is used for finding and collecting query runtime dependents.

In accordance with an embodiment, in the second phase, the systems and methods take queries odometer and list of runtime dependents (found from phase one) as its input.

In accordance with an embodiment, the systems and methods next formulate combinations (or intersections) of members from odometer of only runtime dependent dimensions detected in phase one.

In accordance with an embodiment, the systems and methods, for each intersection, execute the internal precompiled program of the dynamic member to fetch dependent members that are particular and different to each intersection. The systems and methods can then accumulate all dependents found for each intersection as the output and fill it in the expanded odometer of the query. This step goes through stack machine to evaluate program only for metadata. The multidimensional database knows the execution of the formula program for value retrieval already. However, the systems and methods allow for executing the same formula and only fetch dependent members by skipping value retrieval.

In accordance with an embodiment, consider the dynamic member below. For this example, the dynamic member will be named "Test".

```
1)  IF (@ISLEV ("Market", 0) and (@ISLEV ("SITE", 1)
2)      IF (@ISMBR ("New York"))
3)          @PARENTVAL ("Market", "Sales");
4)      ELSE
5)          6;
6)      END IF;
7)  ELSE
8)      @PARENTVAL ("Product", "Sales");
9)  ENDIF;
```

Figure 5:
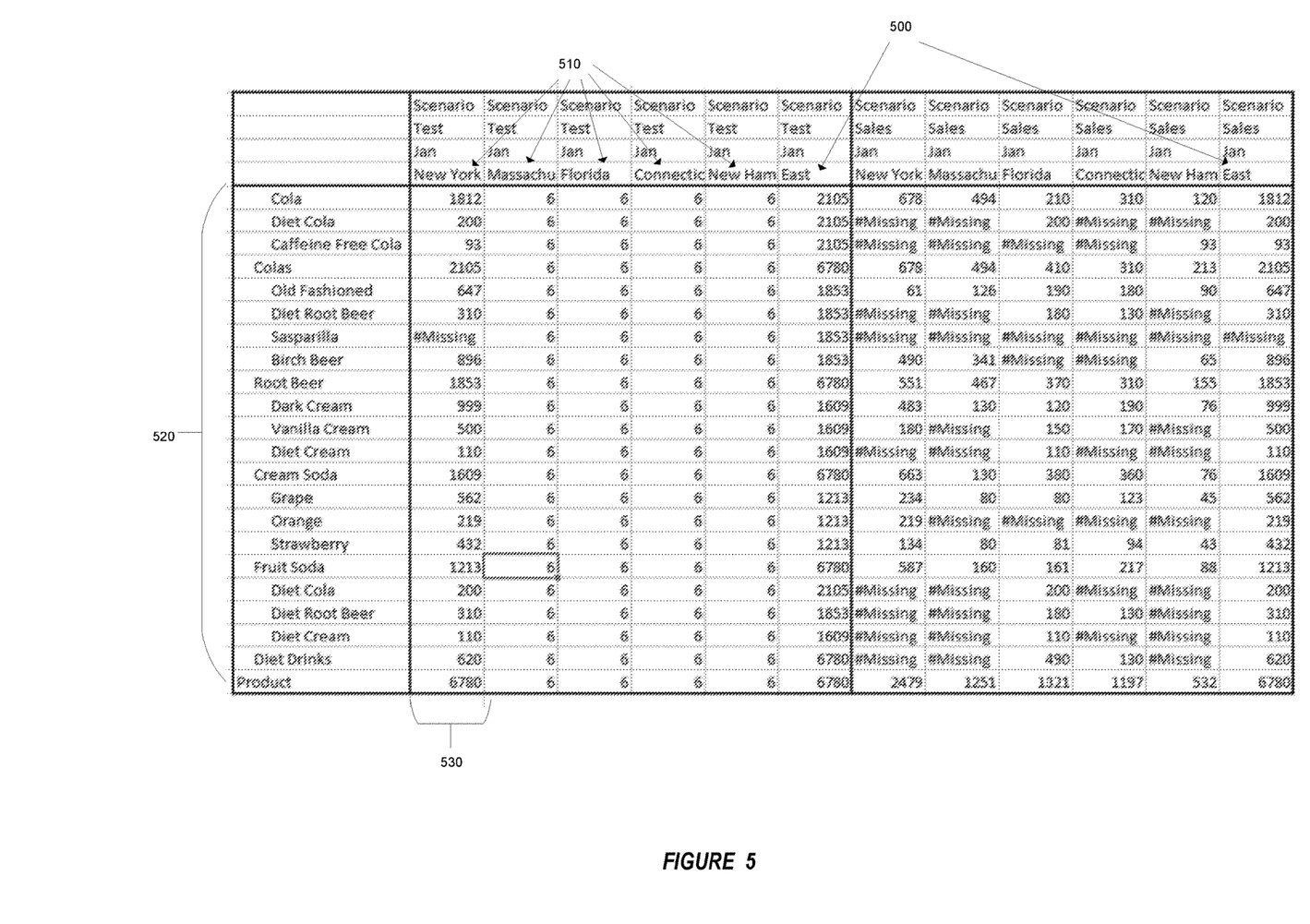
FIG. 5 shows an exemplary data set, in accordance with an embodiment.

FIG. 5 shows an exemplary data set, in accordance with an embodiment.

Within FIG. 5, a number of dimensions are shown, such as market 500, site 510, products 520, and sales 530.

In accordance with an embodiment, and the purposes of the below example, suppose a user has submitted the following request to retrieve a MDX query.

SELECT {[Cola], [Old Fashioned], [Dark Cream], [Grape]} ON ROWS, {[East].Children, [East]} ON COLUMNS FROM [TPDNTest.TPDNTest] WHERE ([Jan], [Test], [Scenario]);

In accordance with an embodiment, [TPDNTest.TPDNTest] can comprise an internal cube created for testing purposes. Running the dynamic member "Test", can result in the data set shown in FIG. 6.

Figure 6:
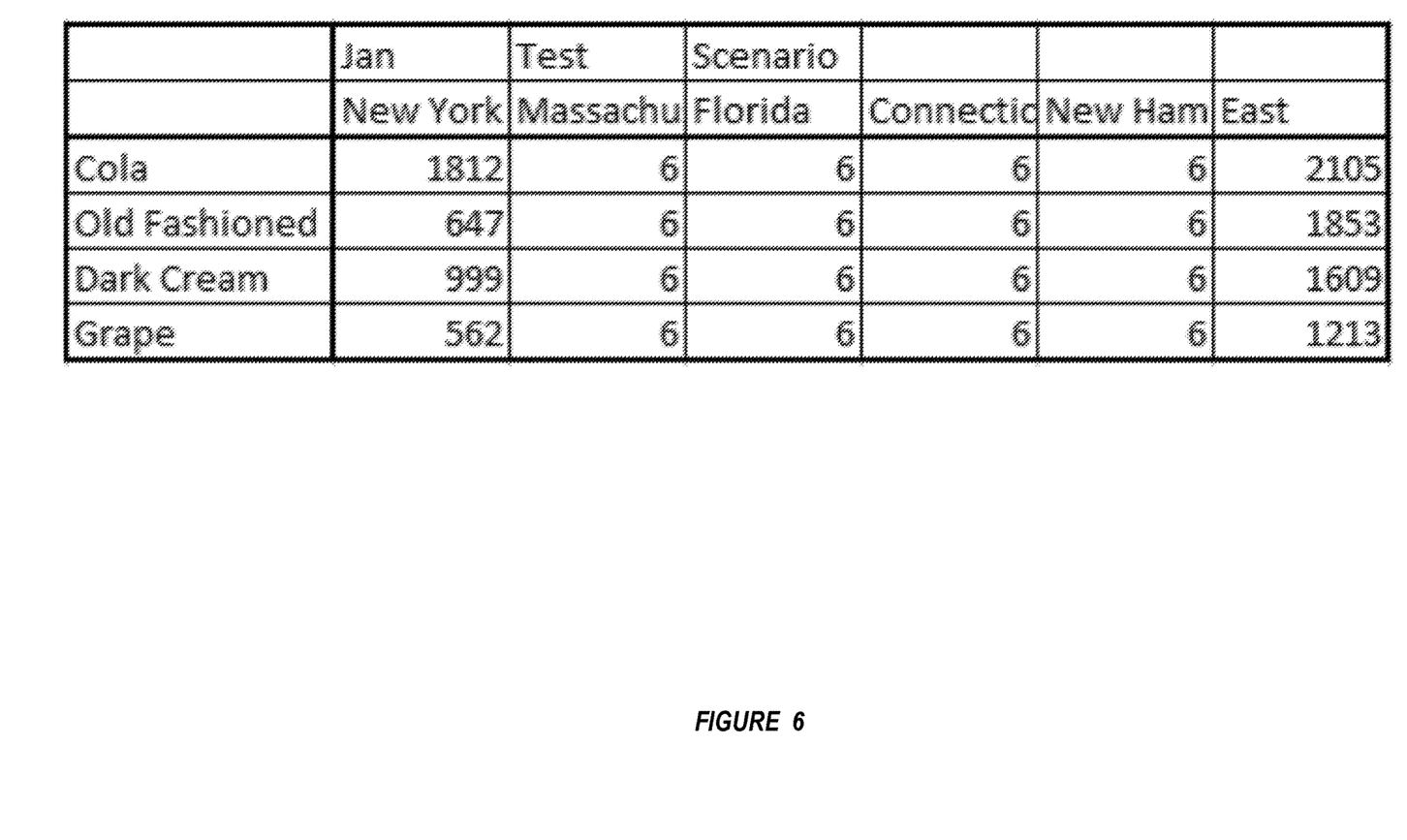
FIG. 6 shows an exemplary data set, in accordance with an embodiment.

In accordance with an embodiment, in considering the dynamic member "Test", the first phase (dependency analysis) returned the dimensions Market and Product as the runtime dependency dimensions. "Test" also has an IF-ELSE pattern. This information, along with the input odometer, is taken as an input by the second phase to fetch the actual runtime dependents. Thus, the newly found dependents, as an output of the second phase, are Sales in the Measures dimension. In addition, there are four members in the Product dimension, namely Colas, Root Beer, Cream Soda, and Fruit Soda.

In accordance with an embodiment, the Output can comprise: First output is array of dimensions on which this formula has "run time" dependency i.e. two dimensions in above example: Product, Market. These dimensions can generate exact list of runtime dependent members during actual retrieval of this formula member at run time.

In accordance with an embodiment, a next output is: the detection of pattern present in the formula which says the list of dependent dimensions used by formula in its "IF" conditions are different or not from that used in the body part of each "IF" of the formula. This pattern detection becomes more complex when IF-ELSE nesting is increased in the formula and is vital part of dependency analysis to correctly fetch the dependent members for each intersection at run time.

In accordance with an embodiment, provided below is a summary of the steps of phase 2.

In accordance with an embodiment, phase 2 can form all mathematical combinations among all the members of runtime dependent dimensions (Market and Product) from the input odometer and execute the program for each combination to fetch dependents.

In accordance with an embodiment, the input odometer members from Market and Product dimensions are:
Product: {[100-10], [200-10], [300-10], [400-10]} OR {[Cola], [Old Fashioned], [Dark Cream], [Grape]} where second set is alias name for corresponding product name
Market: {[New York], [Massachusetts], [Florida], [Connecticut], [New Hampshire], [East]}

In accordance with an embodiment, the total combinations are shown below:
{([100-10], [New York]), ([100-10], [Massachusetts]), ([100-10], [Florida]),
([100-10], [Connecticut]), ([100-10], [New Hampshire]), ([100-10], [East]),
([200-10], [New York]), ([200-10], [Massachusetts]), ([200-10], [Florida]),
([200-10], [Connecticut]), ([200-10], [New Hampshire]), ([200-10], [East]),
([300-10], [New York]), ([300-10], [Massachusetts]), ([300-10], [Florida]),
([300-10], [Connecticut]), ([300-10], [New Hampshire]), ([300-10], [East]),
([400-10], [New York]), ([400-10], [Massachusetts]), ([400-10], [Florida]),
([400-10], [Connecticut]), ([400-10], [New Hampshire]), ([400-10], [East])}

In accordance with an embodiment, phase 2 can then iterate over this list of all combinations, and for each combination, the formula of member "Test" can be evaluated only for fetching dependent members. Phase 2 can add these members, as the dependents, into expanded odometer of Measures, Market, and Product respectively.
{[Sales]}, {[East]}, {[100], [200], [300], [400]}

In accordance with an embodiment, the dependents are collected by executed formula for metadata once for input odometer. This logic also repeats the same process of formulating combinations and executing same program for finding more dependents. This time, it formulates combinations among only the newly added members for runtime dependent dimensions.

In accordance with an embodiment, additionally, in order to evaluate a formula for a particular combination, the formula's precompiled executable program, along with the input combination, both can be fed in to the stack machine framework, which knows how to evaluate the program. This stack machine is an existing work, which knows to evaluate a formula for its value and not for fetching only dependent metadata. Therefore, this stack machine is enhanced with a feature, which allows stack machine to take a formula's program along with combination as its input and execute this program only for fetching metadata as its dependent without invoking the values calculations part of the formula. This mode of stack machine in which program is executed only for fetching dependents is called as "Metadata" mode.

In accordance with an embodiment, phase 2 of the process can execute within a temporary container that can hold the discovered dependent members. This structure can be used to form a dynamically enlargeable list of members and can hold any object created within the multidimensional database.

Figure 7:
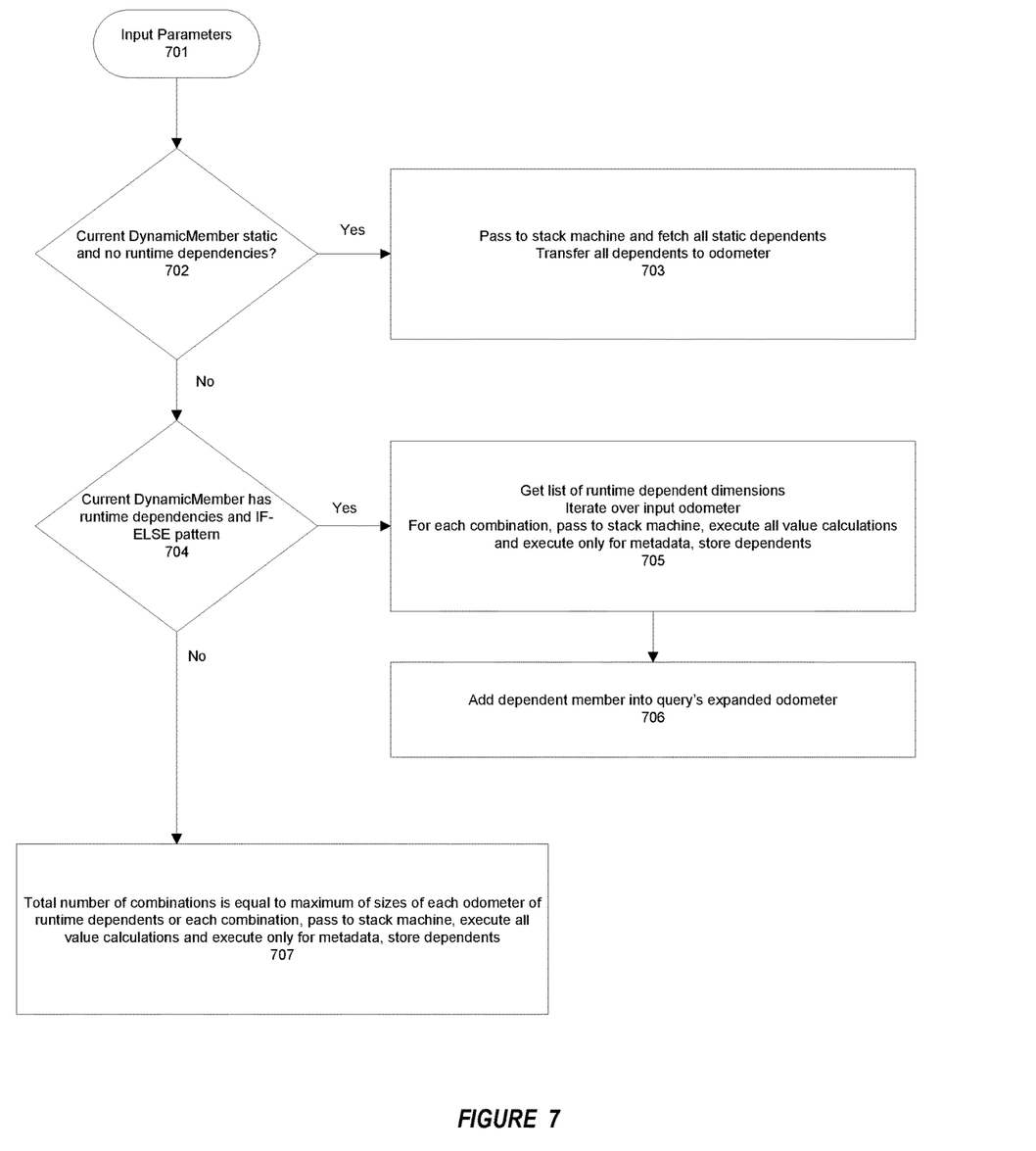
FIG. 7 is a flowchart of an exemplary method for dependency analysis, in accordance with an embodiment.

FIG. 7 is a flowchart of an exemplary method for dependency analysis, in accordance with an embodiment.

In accordance with an embodiment, at step 701, the method can receive input parameters. This includes dynamic member as well as an odometer, which contains the user's retrieval request.

In accordance with an embodiment, at step 702, the method checks whether the dynamic member is static and does not have runtime dependencies. If so, at step 703, the method passes this formula program to stack machine with default combinations. The method executes the program only for one time for default combination to fetch all the static dependents. Then the method transfers all these dependents from temporary container into odometer.

In accordance with an embodiment, at step 704, the method checks if the dynamic member has runtime dependency and if an IF-ELSE pattern is present in the dynamic member's formula. If so, at step 705, the method gets the list of run time dependent dimensions. The method iterates over input odometer of run time dependent dimensions. For each combination (total number is =multiplication of size of each odometer) of members from odometer of run time dependent dimension, the method: passes the current formula program and current combination to stack machine for program execution; while executing program for metadata only, the method excludes all values calculations part from the program and execute only metadata instructions; and the method stores the dependents found from this run of program for current cmi into the temporary container.

In accordance with an embodiment, at this point, program is execute for all possible combinations and all dependents found are present in the temporary container. Now, iterate over this temporary container.

In accordance with an embodiment, at step 706, the method, for each member in the temporary container, adds the dependent member into the query's expanded odometer.

In accordance with an embodiment, at step 707, the method does not need all combinations. Instead, the method selected less number of combinations wherein each ordinate appears just once in all combinations. In this case, the total number of combinations is equal to the maximum of sizes of each odometer of run time dependents. The method, for each combination (total number is =maximum of sizes of each odometer) of members from odometer of run time dependent dimension: passes current formula program and current combination to stack machine for program execution; while executing program for metadata only, the method excludes all values calculations part from the program and execute only metadata instructions; and the method then stores the dependents found from this run of program for current cmi into the temporary container.

In accordance with an embodiment, at this point, program has executed for all possible combinations and all dependents found are present in the temporary container. Now, the method iterates over this temporary container.

In accordance with an embodiment, for each member in the temporary container, the method adds the dependent member into query's expanded odometer.

In accordance with an embodiment, all dynamic members are expanded i.e. all required dependents of each dynamic member are known and added into the query's expanded odometer. This expanded odometer is then taken forward by hybrid flow in a multidimensional database environment, which retrieves the complete odometer in bottom up approach and sends the expected result to back the user.

Figure 8:
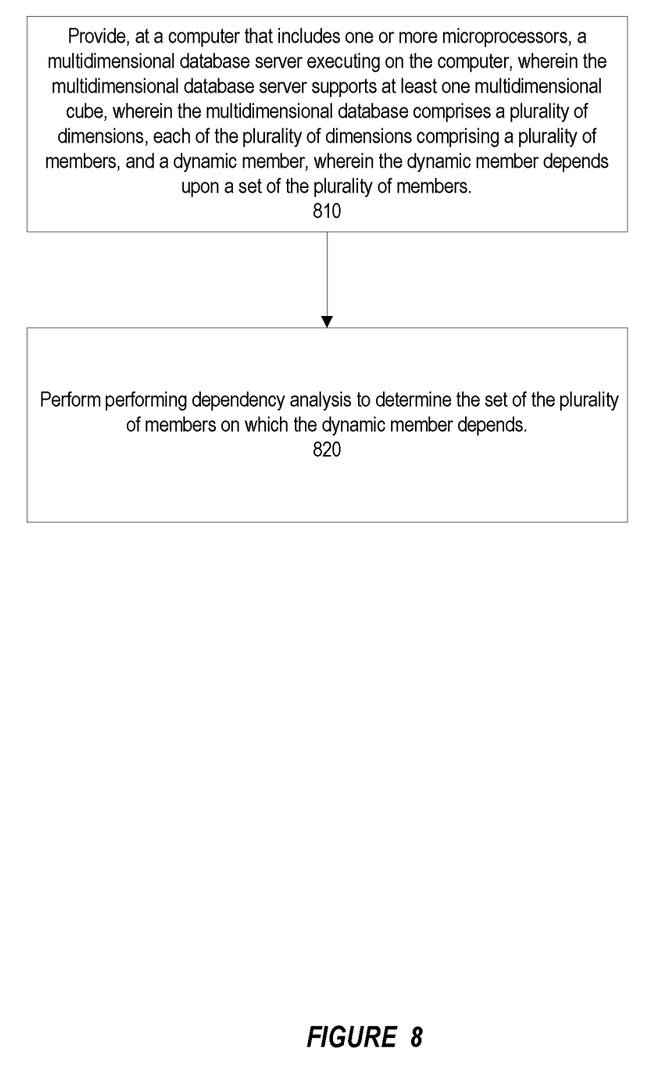
FIG. 8 is a flowchart of an exemplary method for dependency analysis, in accordance with an embodiment.

FIG. 8 shows an exemplary method for dependency analysis in a multidimensional database.

At step 810, the method can provide, at a computer that includes one or more microprocessors, a multidimensional database server executing on the computer, wherein the multidimensional database server supports at least one multidimensional cube, wherein the multidimensional database comprises a plurality of dimensions, each of the plurality of dimensions comprising a plurality of members, and a dynamic member, wherein the dynamic member depends upon a set of the plurality of members.

At step 820, the method can perform performing dependency analysis to determine the set of the plurality of members on which the dynamic member depends.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for dependency analysis in a multidimensional database, comprising:
   a computer that includes one or more microprocessors;
   a multidimensional database server executing on the computer, wherein the multidimensional database server supports at least one multidimensional cube, wherein the multidimensional database comprises a plurality of dimensions, each of the plurality of dimensions comprising a plurality of members; and
   a dynamic member, wherein the dynamic member depends upon a set of the plurality of members;
   wherein, upon a startup operation of the multidimensional database server that supports the at least one multidimensional database cube, the system performs a dependency analysis to determine the set of the plurality of members on which the dynamic member depends;
   wherein the dependency analysis causes the computer that includes one or more microprocessors to perform steps comprising:
      tokenizing the dynamic member resulting in one or more tokens of the dynamic member,
      analyzing each of the one or more tokens of the dynamic member, and
      based upon the analyses of each of the one or more tokens of the dynamic member, determining that the set of the plurality of members on which the dynamic member depends comprises only static dependents; and
   wherein, based upon the determination that the set of the plurality of members on which the dynamic member depends comprises only static dependents, all static dependents upon which the dynamic member depends are fetched and transferred to an input odometer.

2. The system of claim 1,
   wherein the dependency analysis causes the computer that includes one or more microprocessors to perform steps further comprising:
      analyzing each of the one or more tokens of the dynamic member, and
      based upon the analyses of each of the one or more tokens of the dynamic member, determining that the set of the plurality of members on which the dynamic member depends comprises one or more runtime dependents;
   wherein, based upon the determination that the dynamic member depends on one or more runtime dependents, an array of the one or more runtime dependents is produced;
   wherein, based upon the produced array of the one or more runtime dependents, a list of runtime dependent members of the multidimensional database cube is produced.

3. The system of claim 2,
   wherein a query for the dynamic member is run on the multidimensional database cube.

4. The system of claim 3,
   wherein the query for the dynamic member utilizes the list of runtime dependent members of the multidimensional database cube to fetch values associated with each of the dependent members on the list of dependent members.

5. A method for dependency analysis in a multidimensional database, comprising:
   providing, at a computer that includes one or more microprocessors;
      a multidimensional database server executing on the computer, wherein the multidimensional database server supports at least one multidimensional cube, wherein the multidimensional database comprises a plurality of dimensions, each of the plurality of dimensions comprising a plurality of members; and
      a dynamic member, wherein the dynamic member depends upon a set of the plurality of members; and
   upon a startup operation of the multidimensional database server that supports at least one multidimensional database cube, performing dependency analysis to determine the set of the plurality of members on which the dynamic member depends, the performance of the dependency analysis comprising:
      tokenizing the dynamic member resulting in one or more tokens of the dynamic member,
      analyzing each of the one or more tokens of the dynamic member, and
      based upon the analyses of each of the one or more tokens of the dynamic member, determining that the dynamic member depends only on static dependents; and
   fetching, based upon the determination that the dynamic member depends only on static dependents, all static dependents upon which the dynamic member depends and transferring to an input odometer.

6. The method of claim 5, further comprising:
   wherein the performance of the dependency analysis further comprises:
      analyzing each of the one or more tokens of the dynamic member, and
      based upon the analyses of each of the one or more tokens of the dynamic member, determining that the dynamic member depends on one or more runtime dependents;
   producing, based upon the determination that the dynamic member depends on one or more runtime dependents, an array of the one or more runtime dependents; and producing, based upon the produced array of the one or more runtime dependents, a list of runtime dependent members of the multidimensional database cube.

7. The method of claim 6, further comprising
running a query for the dynamic member on the multidimensional database cube.

8. The method of claim 7,
wherein the query for the dynamic member utilizes the list of runtime dependent members of the multidimensional database cube to fetch values associated with each of the dependent members on the list of dependent members.

9. A non-transitory computer readable storage medium having instructions thereon for dependency analysis in a multidimensional database, which when read and executed cause a computer to perform steps comprising:
providing, at the computer that includes one or more microprocessors;
a multidimensional database server executing on the computer, wherein the multidimensional database server supports at least one multidimensional cube, wherein the multidimensional database comprises a plurality of dimensions, each of the plurality of dimensions comprising a plurality of members; and
a dynamic member, wherein the dynamic member depends upon a set of the plurality of members; and
upon a startup operation of the multidimensional database server that supports at least one multidimensional database cube, performing dependency analysis to determine the set of the plurality of members on which the dynamic member depends, the performance of the dependency analysis comprising:
tokenizing the dynamic member resulting in one or more tokens of the dynamic member,
analyzing each of the one or more tokens of the dynamic member, and
based upon the analyses of each of the one or more tokens of the dynamic member, determining that the dynamic member depends only on static dependents; and
fetching, based upon the determination that the dynamic member depends only on static dependents, all static dependents upon which the dynamic member depends and transferring to an input odometer.

10. The non-transitory computer readable storage medium of claim 9, the steps further comprising:
wherein the performance of the dependency analysis further comprises:
analyzing each of the one or more tokens of the dynamic member, and
based upon the analyses of each of the one or more tokens of the dynamic member, determining that the dynamic member depends on one or more runtime dependents;
producing, based upon the determination that the dynamic member depends on one or more runtime dependents, an array of the one or more runtime dependents; and
producing, based upon the produced array of the one or more runtime dependents, a list of runtime dependent members of the multidimensional database cube.

11. The non-transitory computer readable storage medium of claim 10, the steps further comprising:
running a query for the dynamic member on the multidimensional database cube;
wherein the query for the dynamic member utilizes the list of runtime dependent members of the multidimensional database cube to fetch values associated with each of the dependent members on the list of dependent members.

* * * * *